United States Patent [19]

Swick et al.

[11] Patent Number: 4,655,000

[45] Date of Patent: Apr. 7, 1987

[54] BRANCH RETAINER

[75] Inventors: E. Grant Swick, Bartlett, Ill.; Peter K. McCully, Auckland, New Zealand

[73] Assignee: Illinois Tool Works Inc., Chicago, Ill.

[21] Appl. No.: 727,051

[22] Filed: Apr. 25, 1985

[51] Int. Cl.$^4$ .............................................. A01G 17/08
[52] U.S. Cl. .......................................... 47/44; 24/300; 24/555; 24/557
[58] Field of Search .................. 47/44, 46, 47; 24/298, 24/300, 301, 545, 555, 557, 565, 459

[56] References Cited

U.S. PATENT DOCUMENTS

| | | | |
|---|---|---|---|
| 527,911 | 10/1894 | Watkins | 24/555 |
| 2,195,967 | 4/1940 | Liebmann | 24/557 X |
| 2,861,311 | 11/1958 | Kurland | 24/300 |
| 3,174,787 | 3/1965 | Kolman | 24/300 X |
| 3,186,704 | 6/1965 | McCloskey et al. | 24/300 X |
| 3,290,743 | 12/1966 | Hanson | 24/301 |
| 4,329,762 | 5/1982 | Maidhof | 47/44 X |
| 4,354,299 | 10/1982 | Maidhof | 47/44 X |
| 4,534,129 | 8/1985 | Stuckey | 47/47 |

FOREIGN PATENT DOCUMENTS

| | | | |
|---|---|---|---|
| 820222 | 11/1951 | Fed. Rep. of Germany | 47/47 |
| 2841987 | 4/1980 | Fed. Rep. of Germany | 47/44 |
| 2905551 | 8/1980 | Fed. Rep. of Germany | 47/47 |
| 2490068 | 3/1982 | France | 47/46 |
| 790369 | 2/1958 | United Kingdom | 47/47 |
| 1273231 | 5/1972 | United Kingdom | 47/44 |
| 664615 | 5/1979 | U.S.S.R. | 47/44 |
| 671782 | 7/1979 | U.S.S.R. | 47/44 |
| 978778 | 12/1982 | U.S.S.R. | 47/44 |

Primary Examiner—Robert A. Hafer
Assistant Examiner—Danton DeMille
Attorney, Agent, or Firm—J. P. O'Brien; T. W. Buckman

[57] ABSTRACT

A one-piece fastener is disclosed for loosely retaining a transversely extending branch with respect to a horizontal support wire. The fastener is molded of resilient plastic material in form of a flexible filament portion with a clip portion integrally formed at its opposite ends. Each of the clip portions have a generally tubular body with a cylindrical-shaped throughbore formed longitudinally and with an elongate slot formed lengthwise of the tubular body in direct communication with the throughbore to define a throat for receiving the support wire into the throughbore. Each end of the filament portion is connected to one of the tubular bodies at a point adjacent to its elongate slot and adjacent to one of its ends which provides an offset relationship between the flexible filament portion and the two tubular bodies.

5 Claims, 5 Drawing Figures

U.S. Patent    Apr. 7, 1987    4,655,000
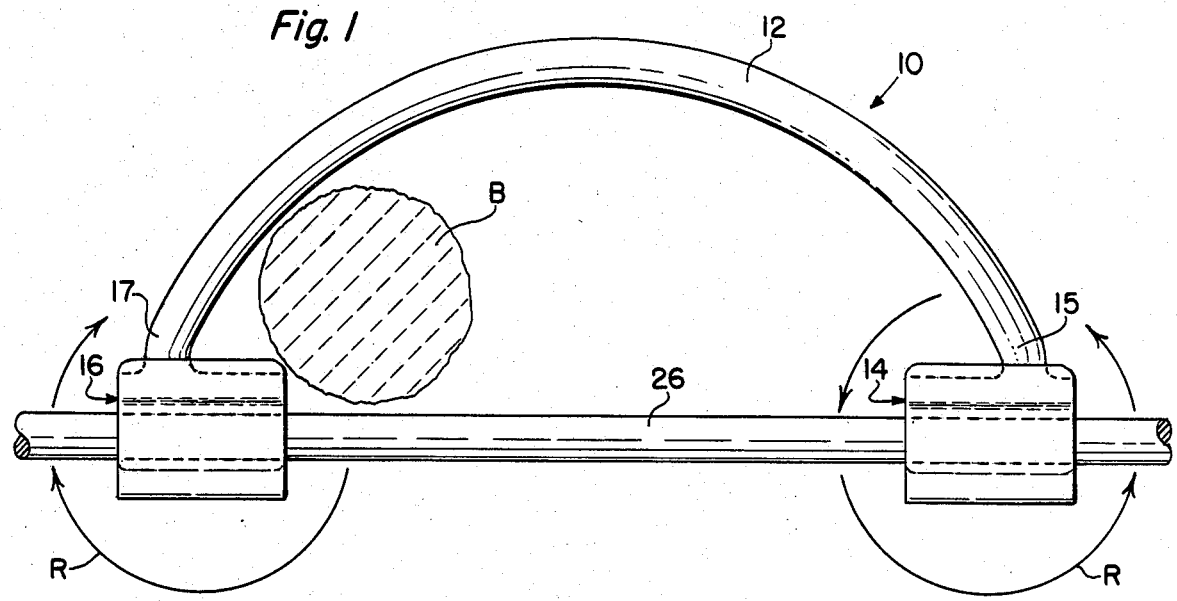
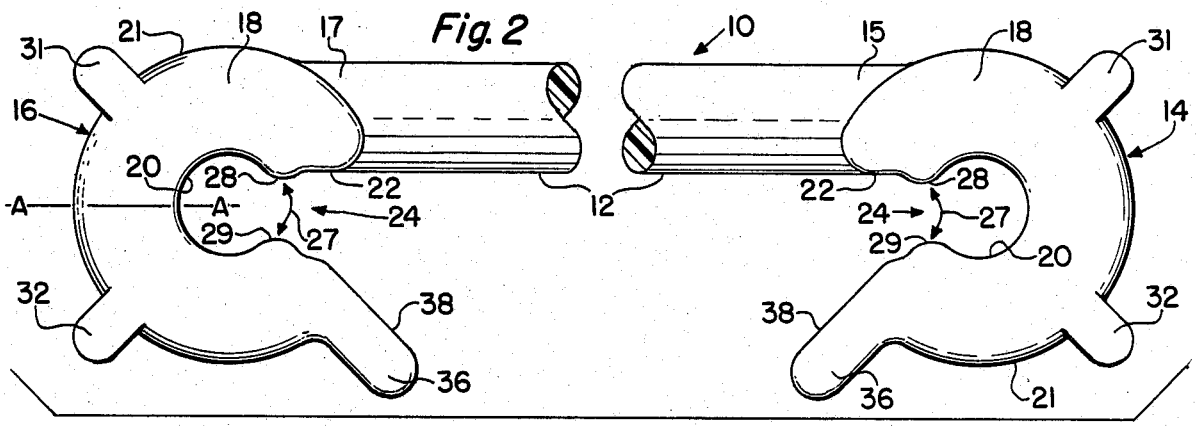
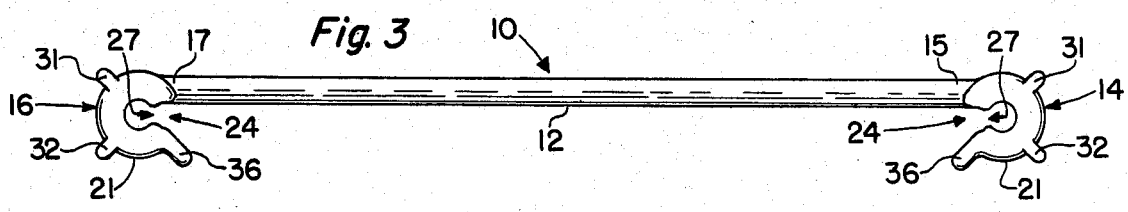
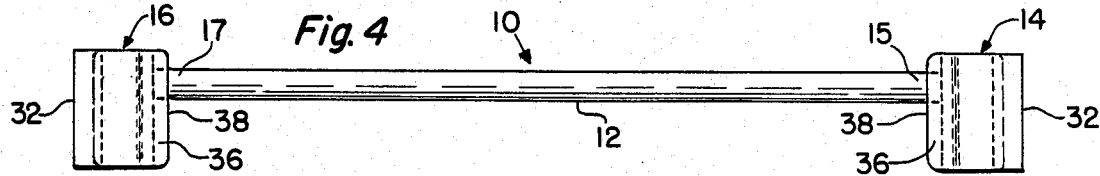
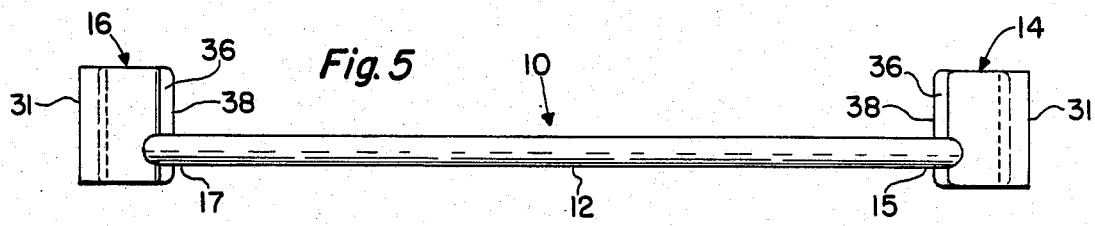

BRANCH RETAINER

BACKGROUND OF THE INVENTION

It is common practice in the fruitgrowing industry to train vine and branches to grow across horizontal support wires. In order to maximize the yield of the fruit crop, it is important that the vine or branch be retained in a relatively fixed position with respect to the support wire.

One known fastener for retaining a branch or vine along a support wire is disclosed in copending design patent application Ser. No. 682,138, filed Dec. 17, 1984, which is in the name of Peter K. McCully and assigned to the same assignee as this invention. The fastener disclosed in the aforementioned design application has been found to work successfully for smaller branches. However, it has been found that larger branches tend to slide the fastener along the support wire in the presence of a strong wind or due to the expansion force exerted by the growth of the branch over a period of time.

This invention overcomes the above-noted deficiencies by providing a fastener that has greater gripping forces on the support wire while maintaining substantially the same amount of force required to install and remove the fastener for the support wire.

Another object of this invention is to provide a fastener which is inexpensive to mold from plastic materials and which is easy to install on and remove from a support wire.

SUMMARY OF THE INVENTION

This invention relates to a one-piece fastener molded of a resilient plastic material and designed to snap onto a support wire for loosely retaining a transversely extending branch or the like. The one-piece fastener comprises a flexible filament portion and a clip portion integrally formed at its opposite ends. The two clip portions are identical in construction, having a generally tubular body extending transversely to the flexible filament portion which is formed with a longitudinally extending cylindrical throughbore. An elongate slot is formed lengthwise through the surface of each tubular body in direct communication with the cylindrical throughbore to define a throat for engaging and snapping over a support wire. Each of the ends of the filament portions are connected to the tubular bodies adjacent to the elongate slot and are located adjacent to one end of the tubular bodies to provide an offset relationship between the flexible filament portion and the two tubular bodies. This offset relationship increases the frictional resistance of the fastener against sliding and thereby increase the gripping force of the fastener on the support.

DESCRIPTION OF DRAWING

For a better understanding of this invention, reference may be made to the accompanying drawing, in which:

FIG. 1 is a side elevational view of the preferred embodiment of this invention when installed on a support wire;

FIG. 2 is a partial enlarged view of a preferred embodiment of this invention taken from a top plan view with the middle section of the filament portion shown broken away;

FIG. 3 is a side plan view of the preferred embodiment of the invention;

FIG. 4 is a bottom plan view of FIG. 3; and

FIG. 5 is a top plan view of FIG. 3.

DESCRIPTION OF PREFERRED EMBODIMENT

There is illustrated in FIGS. 3, 4 and 5, the preferred embodiment of this invention which is generally designated by the reference numeral 10. Fastener 10 is constructed in the form of a flexible filament 12 having a clip portion 14 attached at one end 15 and identical clip portion 16 attached at the other end 17.

Clip portions 14 and 16 are identical in construction. Each have a tubular body 18 with a cylindrical-shaped throughbore 20 formed along its center axis.

An elongate slot 22 extends radially of throughbore 20 along the length of the tubular body 18 between its outside circumferential surface 21 and the throughbore 20 to define a throat 24 for receiving a support wire 26 therein.

The cylindrical-shaped throughbore 20 has a diameter slightly smaller than the diameter of support wire 26. At the entrance to the throat 24, there is provided a means 27 for controlling the throat clearance to increase the gripping force on the support wire. This control means 27 comprises a pair of opposing convex ramp surfaces 28 and 29 which are integrally formed lengthwise on opposing sides of slot 22 and the point of intersection of the sides of slot 22 with the throughbore 20.

The value of the convex ramp surfaces 28 and 29 is that they substantially increase the gripping force exerted on a support wire such as support wire 26, while requiring only a small increase in the force required to install and remove the clip 16 from the support wire 26.

Alternatively, the convex ramp surfaces 28 and 29 could be formed by two or more spaced convex ramp segments formed along the opposing sides of slot 22 in opposing confronting relation.

When installing the clip portion 16 on to the support wire 26, there is provided a finger guide means 30 for causing the user to push the clip portion 16 on the radial line of cylindrical bore 20 which generally disects through the throat 24. As clearly depicted in FIG. 2, finger guide means 30 comprises two parallel spaced ribs 31 and 32 intricately formed on the circumferential surface 21 of tubular body 18 and extending axially of the cylindrical bore 20. The parallel ribs 31 and 32 are equally spaced from the radial plane A—A (FIG. 2). Radial plane A—A passes through the center of cylindrical throughbore 20 and bisects the throat opening 24.

Each of the clip portions 14 is provided with a finger gripping means 36 which is provided to facilitate the removal of the clip portion 14 from the support wire 26. Finger gripping means 36 comprises a lever arm 38 which is integrally formed with the tubular body 18 and extends in a generally radial direction of the cylindrical throughbore 20 and is formed outwardly of convex ramp surface 29. The length and width of the lever arm 38 allows the user to selectively enlarge the throat 24.

Referring to FIG. 1, there is illustrated the installation of the fastener 10 on a horizontal support wire 26 for loosely retaining a tree branch B. One of the two clipped portions 14 and 16 is first installed on the support wire 26 by positioning its elongate slot 22 against the support wire 26 and pressing upwardly on its pair of finger guide ribs 31 and 32 to cause the throat opening to momentarily expand and snap over the support wire 26.

The unfastened clip portion is then repositioned to cause the flexible filament to bend around the branch B and to bring the clip portion to a fastening position with its elongate slot 22 in an abutting relation with the support wire 26. The user then presses upwardly against the finger guide ribs 31 and 32 until the throat 24 momentarily enlarges to permit its tubular body 18 to snap over support wire 26. At this point, the branch B is loosely retained between the fastener 10 and that span of support wire 26 contained between the clip portions 14 and 16.

Since the purpose of the fasteners 10 is to retain a branch B in a relatively fixed position. It is an object of this invention that the clip portions 14 and 16 remain in a fixed location on wire 26 throughout the fruit growing season. During the season, there are a number of forces which act on the fastener 10 to displace the position of clip portions 14 and 16, such as wind forces acting on branch B and the natural inclination of the branch B to grow in a certain direction. This invention provides two separate means for preventing any displacement of the clip portions 14 and 16 throughout the fruit growing season. One of these means is the grip control means in the form of the cooperating opposing convex ramp surfaces 28 and 29. As previously explained, these pair of ramp surfaces cooperate to substantially increase the gripping force of the clip portions 14 and 16 relative to a support wire 26.

A separate means of increasing the gripping force of both clip portions 14 and 16 relative to the support wire 26 is the offset mounting relationship between the flexible filament 12 and the tubular body 18 for both clip portions 14 and 16. Due to the offset relationship, it will be appreciated that any outward force directed on flexible element 12 by branch B will tend to cause a rotative type force (as indicated by the arrows R in FIG. 1) to be introduced to the clipped portions 14 and 16. This rotative force causes the tubular body 18 to have a tendency to twist relative to the horizontal support wire 26 and thereby produces a drag force on the clipped portions 14 and 16. This frictional resistance has the net effect of providing an additional gripping force.

In practice, the gripping force provided by the use of convex ramp surfaces 28 and 29 has been found sufficient to avoid any movement of the fastener 10 during the fruit growing season. Likewise, the drag or gripping force provided by the offset relation between the filament 12 and its two clipped portions 14 and 16 has been found more than adequate to avoid any slippage of the fastener 10 relative to the support wire 26.

We claim:

1. A one-piece fastener molded of a resilient plastic material and adapted to snap fit onto a support wire for loosely retaining a plant, said fastener comprising a flexible filament portion and a clip portion integrally formed at the opposite ends of said filament portion, said flexible portion being molded to be in a relaxed stretched-out condition and to be disposed along a generally straight line, each of said clip portions having a generally tubular body extending transversely to said flexible filament portion, a cylindrical-shaped throughbore formed longitudinally through said tubular body, and an elongate slot formed lengthwise through the surface of said tubular body and in direct communication with said throughbore to define a throat for receiving said support wire into said throughbore, each of said ends of said filament portion connected to one of said tubular bodies adjacent to said elongate slot at a location between the mid-length point and one of its ends to provide an offset relationship between said flexible filament portion and each of said tubular bodies, said ends of said filament portion being connected to said tubular bodies in a perpendicular relationship with a radial line of said cylindrical-shaped throughbore and with said elongate slot of said tubular bodies facing each other when said filament portion is in said relaxed stretched-out condition.

2. A one-piece fastener as defined in claim 1, further comprising means for controlling the spacing of said throat to increase the gripping force on said support wire.

3. A one-piece fastener as defined in claim 2, wherein said means for controlling the spacing of said throat comprises an integrally formed convex ramp surface on opposing sides of said elongate slot at its point of intersection with said throughbore.

4. A one-piece fastener as defined in claim 8, further comprising finger guide means on the outside surface of each of said tubular bodies for locating the proper placement of the user's finger to install each of said clip portions onto said support wire.

5. A one-piece fastener as defined in claim 4, said finger guide means comprises a pair of spaced ribs formed lengthwise on the outside surface of said tubular body of each clip portions, the plane defined by said pair of spaced ribs being colinear to the radial line of said cylindrical-shaped throughbore which passes through the center of said elongate slot.

* * * * *